Sept. 1, 1970   H. W WESSELLS III   3,526,426
VEHICLE BODY COWL-TOP AND WINDSHIELD FRAME STRUCTURE
Filed Dec. 11, 1968   3 Sheets-Sheet 1

INVENTOR.
HENRY W. WESSELLS, III
BY
John B. Sowell
ATTORNEY

Sept. 1, 1970   H. W WESSELLS III   3,526,426
VEHICLE BODY COWL-TOP AND WINDSHIELD FRAME STRUCTURE
Filed Dec. 11, 1968   3 Sheets-Sheet 2

INVENTOR.
HENRY W. WESSELLS, III
BY
*John B. Sowell*
ATTORNEY

Sept. 1, 1970   H. W WESSELLS III   3,526,426
VEHICLE BODY COWL-TOP AND WINDSHIELD FRAME STRUCTURE
Filed Dec. 11, 1968   3 Sheets-Sheet 3

INVENTOR.
HENRY W. WESSELLS, III
BY
*John B. Sowell*
ATTORNEY

United States Patent Office 3,526,426
Patented Sept. 1, 1970

3,526,426
VEHICLE BODY COWL-TOP AND WINDSHIELD FRAME STRUCTURE
Henry W. Wessells III, Paoli, Pa., assignor to The Budd Company, Philadelphia, Pa., a corporation of Pennsylvania
Filed Dec. 11, 1968, Ser. No. 783,083
Int. Cl. B62d 25/08
U.S. Cl. 296—28                           7 Claims

ABSTRACT OF THE DISCLOSURE

A unitized automobile body having a windshield frame forming a cowl-top and the outer surfaces of the windshield pillar post; said frame being connected to the vehicle body at the frame edges to form a reinforcement for the vehicle body.

BACKGROUND OF INVENTION

Heretofore, it was the general practice to form the windshield opening from several parts or panels welded together in the form of a frame. Windshield frames were generally made by extending flanges and shapes from the roof, the cowl, and the windshield pillars of the A-Post. When windshield frames were made as integral units, it was not usual to employ any part of the frame as an exterior panel or a structural body part because of the difficulty of assembling the frame to the vehicle body and because of the difficulty in making secure final frame-to-body connections.

SUMMMARY OF INVENTION

According to the present invention, the windshield frame is made as an integral stamping which forms at the top of the windshield, the upper windshield header, and at the sides the outer windshield pillar posts. The bottom of the windshield frame is extended downward in the form of a cowl-top and extend laterally beyond the sides of the windshield overlapping the outside of the side frames where it is secured by arc welding to the hinge pillar portion of the A-Post. The panel is so joined that it is easily connected by arc and resistance welding to the vehicle body in final assembly along joint lines that will be covered by the finished body panels or along lines ordinarily hidden from the sight of an observer. The principal object of the invention is to provide a novel structural windshield frame which is stamped as an integral unit so as to accurately control its size, and to eliminate matching and sealing of parts required of fabricated frames. A further object of the present invention is to simplify the assembly of the vehicle body by providing accurately sized and shaped structural body parts integral with the windshield that serve to control the spacing and final connection of the body parts connected thereto. Another object of the present invention is to provide a novel light weight structural frame easily connected to a vehicle body to reinforce and strengthen it. The above and other objects of the invention and its many features and advantages will be apparent from the following description of the preferred embodiment, reference being made to the accompanying drawings.

DESCRIPTION OF THE PREFERRED EMBODIMENT

Figure 1:
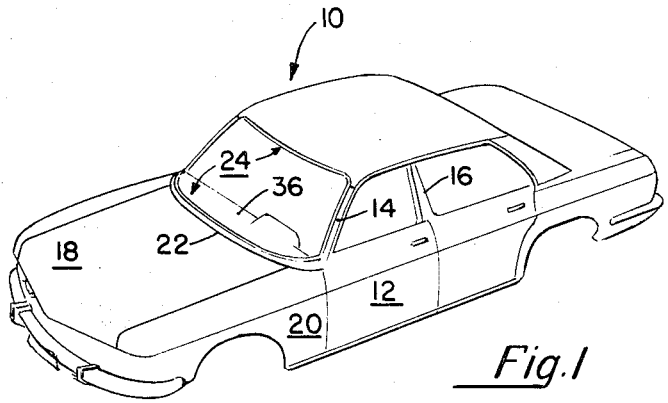
FIG. 1 is a perspective view of a vehicle body embodying the present invention.

Vehicle body 10 represents a standard size automobile of unitized construction having a front door 12 hinged to the A-Post 14 to close or lock upon the BC Post 16. A broad hood 18 extends between the fenders 20 and its rear edge 22 terminated adjacent the windshield frame 24.

Figure 2:
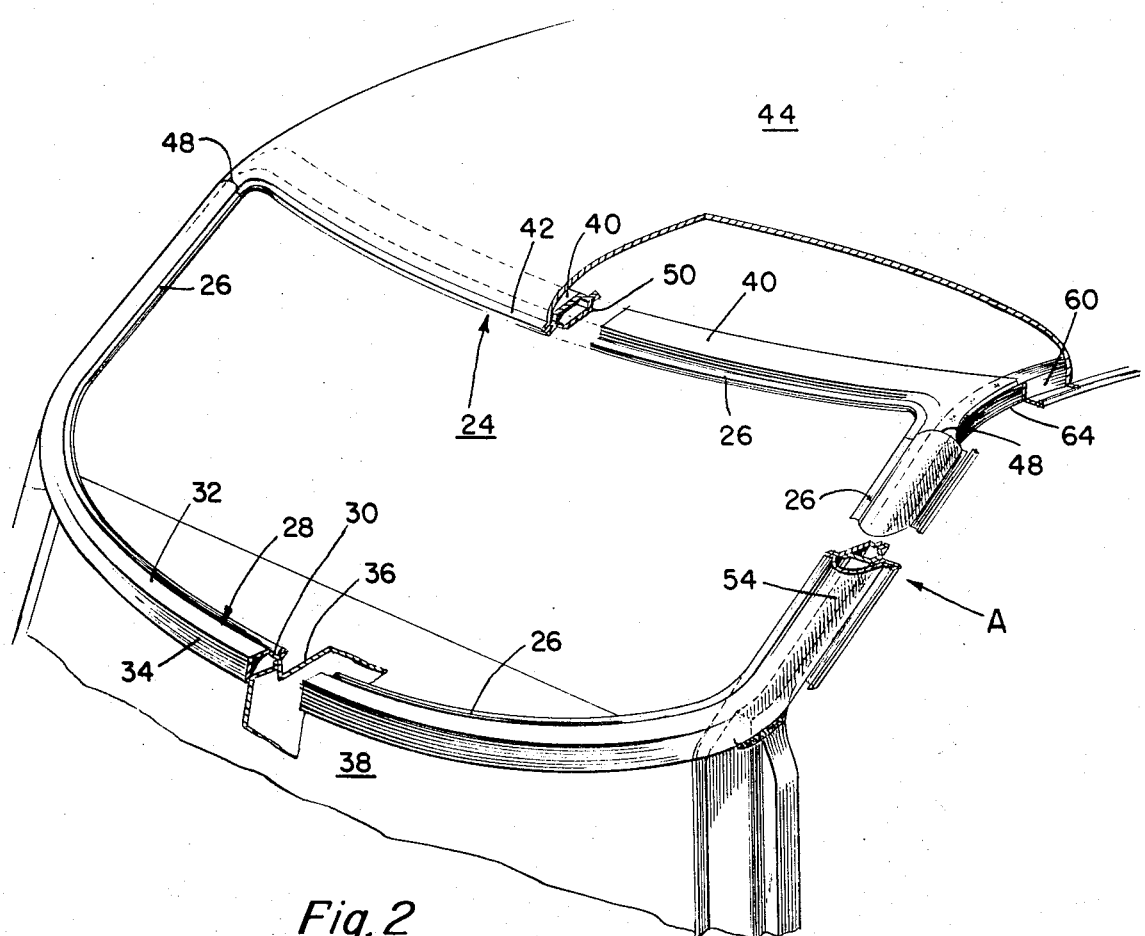
FIG. 2 is an enlarged perspective view of the windshield and A-Post area of the vehicle body of FIG. 1.
Figure 3:
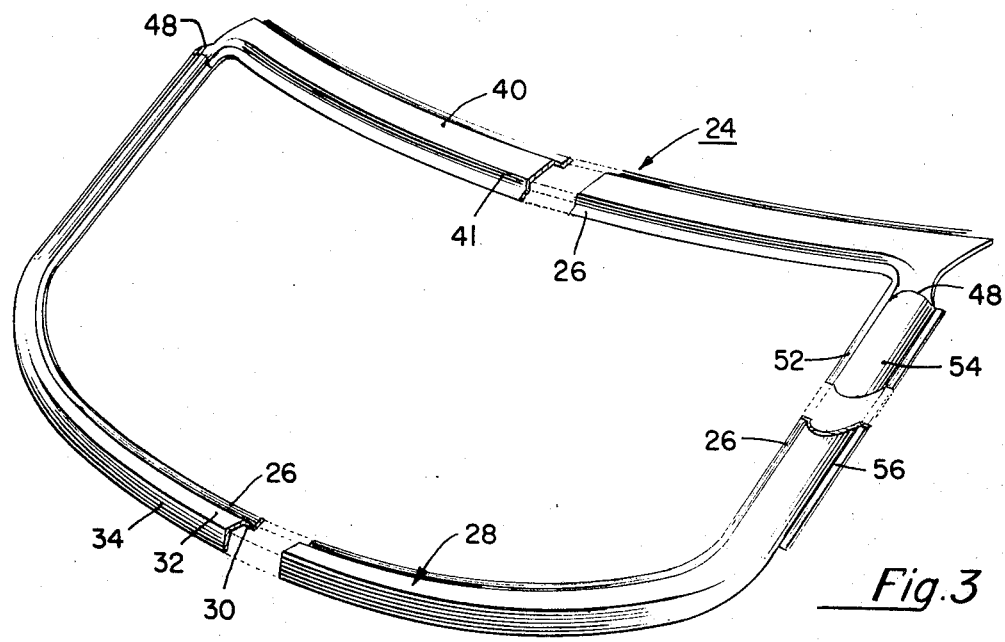
FIG. 3 is a perspective view of the cowl-top and windshield frame structure of FIG. 2.
Figure 4:
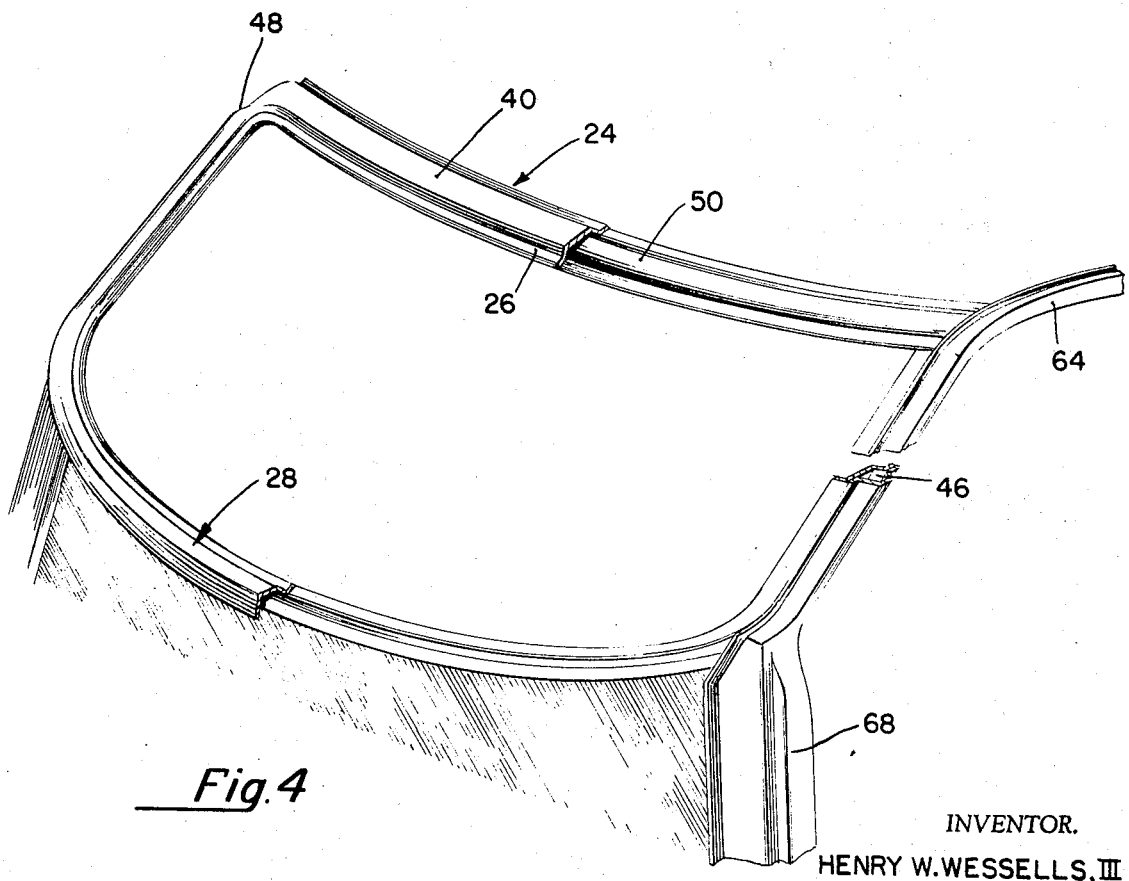
FIG. 4 is a perspective view of the windshield and A-Post area of FIG. 2 with the roof, instrumental panel, and part of the cowl-top and windshield structure removed.
Figure 5:
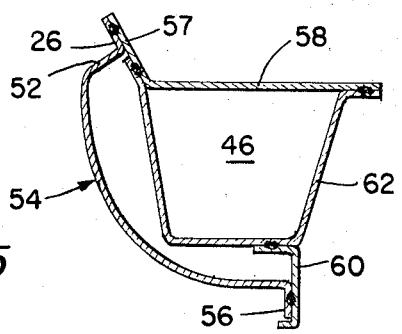
FIG. 5 is an enlarged horizontal section of the windshield pillar of the A-Post shown at A in FIG. 2.
Figure 7:
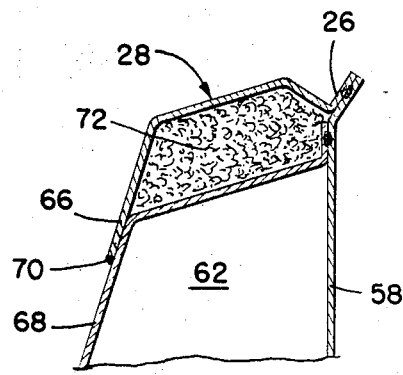
FIG. 7 is an enlarged vertical section of the cowl-top and windshield structure connection to the A-Post taken at lines 7—7 of FIG. 6.
Figure 6:
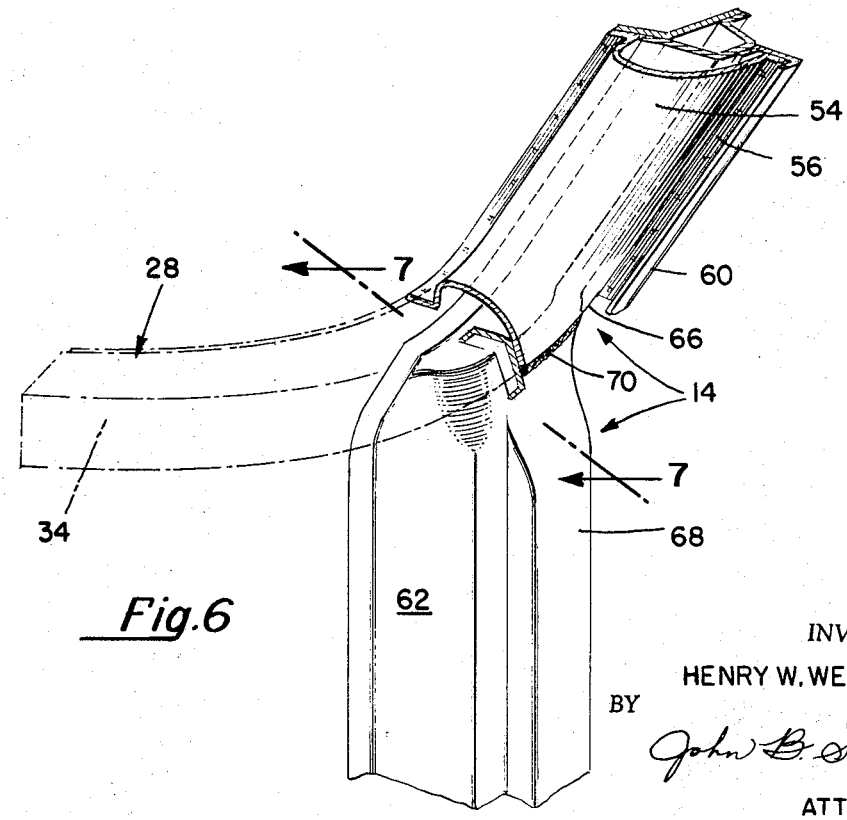
FIG. 6 is an enlarged perspective view of the cowl-top and windshield structure connection to the A-Post.

The windshield frame 24 is shown in FIGS. 2 to 4 as an integral stamping having an inner flange 26 upon which a formed rubber windshield moulding strip (not shown) is mounted to hold the windshield. Adjacent the inner flange 26, the windshield frame 24 is raised or changes direction sharply to retain the windshield and moulding strip. The lower edge of frame 24 forms a cowl-top 28 having a fence portion 30, a horizontal web portion 32 in the same plane as the hood 18, and a downwardly depending leg portion 34. The cowl-top 28 is here attached to the dash panel 36 and to cowl 38, however, the channel shaped cowl-top 28 may be attached to either a horizontal or vertical transverse cross member, such a plenum panel, dash panel or firewall panel.

The upper edge of windshield frame 24 is shown in FIGS. 2 to 4 as being a hat-shaped section 40 which is attached by its inner flange 26 adjacent fence portion 41 to the front flange 42 of roof panel 44. To conceal the joints between the edge of the roof where it overlaps the windshield pillar post portion 46 of the A-Post 14, the hat-section 40 is stepped down or dropped below the surface of the roof panel 44 at edge 48. When inner flange 26 of section 40 is attached to front flange 42 of the roof panel, it forms a roof header 40 reinforcing the roof along the top of the windshield. In a relatively large automobile, it is sometimes preferable to further reinforce the windshield by an additional hat-shaped section 50. An additional section may be added to increase the strength of the roof structure in compliance with governmental safety requirements.

The sides of the windshield frame, as shown in FIGS. 2, 3, 5, and 6 have fence portions 52 adjacent flanges 26. Each side has a curved windshield post portion 54 which terminates in an outwardly directed flange 56. The windshield post portion 54 forms an outer panel visible to an observer from the edge 48 of the roof 44 all the way down the windshield pillar post 46 to a point where it disappears beneath the front fender 20 at the hood line. Flange 26 of post portion 54 is connected to a flange 57 on the inner panel 58 of the A-Post 14. Flange 56 of post portion 54 is connected to a drip gutter 60 which in turn is attached to the side frame panel 62 which forms the A-post 14 as well as the roof rail 64.

The flange 56 of the post portion 54 and the drip gutter 60 both terminate just above the fender 20. The outside edge portion of the windshield post portion 54 is directed both downwardly and outwardly as it continues below the upper surface of the fender 20. The edge then wraps around and nests over the hinge post portion 68 of the A-Post 14. Thus, windshield post portion 54 makes a transition or change of shape as it turns from the A-Post 14 and proceeds horizontally to form the cowl-top 28. This lower edge 66 of post portion 54- cowl-top 28 is connected to the A-Post 14 by arc welding 70 along the seam formed at the edge 66 and the side frame 62, and is then hidden from view by the fender 20 shown removed in FIGS. 2 and 6. The open beam formed between the A-Post 68 and the structural extension of the windshield frame aids in the ease of assembly and provides a strong structural shape that may be easily sealed off from the entry of fluids by inserting a foamed plastic sealant 72 in the open beam cavity. The manner in which the cowl-top 28 is connected to the A-post 68 permits the sealant to be inserted at the inner or outer side of the side frame 62.

Having explained the structural panels and hollow beams formed as an outward continuation of the windshield frame and the manner of connecting these panels to a vehicle body structure with a single preferred embodiment, it will be understood that the preferred shape may be modified for connection to other vehicle bodies within the general scope of the invention.

I claim:

1. In a vehicle body a structural frame for reinforcing the front windshield area between the A-Posts comprising: a windshield frame having an inner flange connected to an adjacent fence portion of a cowl-top, said inner flange and adjacent fence portion adapted to receive a molding strip for mounting a windshield thereon, said cowl-top having a web portion and a downwardly depending leg portion forming a channel shape for connection to a transverse cross member of the vehicle body, a pair of windshield post portions connected to the sides of said windshield frame, said post portions being formed as a continuation of said windshield frame and said cowl-top, an outwardly directed flange on each windshield post portion for connecting it to the windshield pillar post portion of an A-Post, and an outwardly and downwardly directed edge on said windshield post portion overlapping said A-Post and being secured thereto by arc welds.

2. In a vehicle body as set forth in claim 1 which further includes a windshield header portion connected to the upper edge of the windshield frame.

3. In a vehicle body as set forth in claim 2 wherein said windshield header portion is offset below the remainder of the structural frame and is connected to the roof panel below the outer surface of the roof panel.

4. In a vehicle body as set forth in claim 3 wherein said cowl-top portion, said windshield post portions, and said windshield header portion are formed as hollow structural shapes connected to the vehicle body to form hollow beam reinforcements therewith.

5. In a vehicle body as set forth in claim 4 wherein said cowl-top portion and said windshield post portions form outer panels of the vehicle body.

6. In a vehicle body as set forth in claim 5 wherein the cowl-top portion is connected to the instrument panel and the transverse cowl.

7. In a vehicle body as set forth in claim 6 where each windshield post portion is further connected to an A-Post by the inner windshield flange.

References Cited

UNITED STATES PATENTS

| | | | |
|---|---|---|---|
| 2,041,757 | 5/1936 | Haberstump | 296—28 XR |
| 2,043,050 | 6/1936 | Lundberg. | |
| 2,075,936 | 4/1937 | Graebner et al. | |
| 2,171,191 | 8/1939 | Potter | 296—84 |
| 2,230,324 | 2/1941 | Haberstump | 296—84 |
| 2,719,749 | 10/1955 | Richards et al. | 296—28 |

FOREIGN PATENTS

| | | |
|---|---|---|
| 1,182,579 | 1/1959 | France. |
| 283,196 | 4/1928 | Great Britain. |

BANJAMIN HERSH, Primary Examiner

L. J. PAPERNER, Assistant Examiner

U.S. Cl. X.R.

296—84